Figure 1:
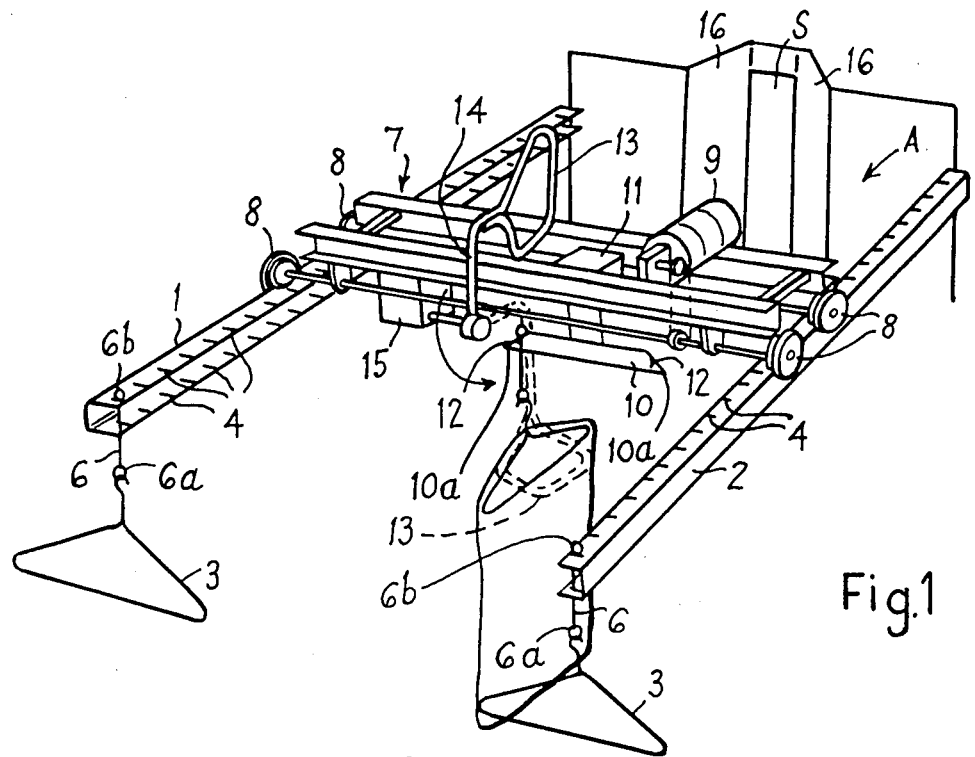

United States Patent [19]

Edwards

[11] Patent Number: 4,717,305
[45] Date of Patent: Jan. 5, 1988

[54] SELF-SERVICE APPARATUS

[76] Inventor: John D. Edwards, Sylvan Hurst, Tower Hill, Dorking, Surrey, RH4 2AN, England

[21] Appl. No.: 905,480

[22] Filed: Sep. 8, 1986

[51] Int. Cl.$^4$ .............................................. B65G 1/04
[52] U.S. Cl. ................................... 414/134; 198/375; 198/411; 198/416; 198/680; 414/266; 414/268; 414/754
[58] Field of Search ............... 198/411, 416, 375, 680; 414/266, 267, 268, 286, 754, 134, 136, 280; 221/290; 901/17, 1

[56] References Cited

U.S. PATENT DOCUMENTS 2,723,743  11/1955  Carter .................................. 198/411
4,626,160  12/1986  Shiomi et al. .................... 414/268 X

FOREIGN PATENT DOCUMENTS 48311  3/1984  Japan .................................. 414/280

Primary Examiner—Robert J. Spar
Assistant Examiner—Stuart J. Millman
Attorney, Agent, or Firm—Killworth, Gottman, Hagan & Schaeff

[57] ABSTRACT

A self-service apparatus for the delivery of sheet-like articles, such as garments, comprises at least two parallel rails having notches defining a plurality of locations at each of which can be stored an article on a hanger ready to be delivered to a customer. In response to an authorized request by a customer, a carriage is driven along the rails for picking up and conveying an article from any specific location to a reception region at which the article can be received by the customer. The apparatus also includes a control device which is actuated as a selected article is picked-up by the carriage so as to rotate the article from its storage position to a position at which it is held edgewise-on as it is conveyed towards the reception region.

7 Claims, 2 Drawing Figures

SELF-SERVICE APPARATUS

The present invention relates to self-service apparatus which can dispense or deliver articles in response to an authorised requesting operation.

The invention is more particularly concerned with problems related to the self-service dispensing or delivering of what may be termed as "sheet-like articles", i.e. those having a large surface area compared to their thickness. One example of sheet-like articles which it is desired to dispense or deliver from a self-service apparatus is garments which have been dry-cleaned or laundered and self-service apparatus has been proposed whereby this may be achieved. Such apparatus may consist of a plurality of locations at each of which can be stored a garment to be delivered to a customer, conveyor means for picking up and conveying a garment from any specific location to a reception region at which the garment can be received by a customer and operating means actuated in response to an authorised request from a customer for initiating operation of the conveyor means to pick up and deliver a garment from a specified location to the customer reception region.

The locations generally comprise storage positions on a rail from which the garments are hung side-by-side in planes generally normal to the direction of the rail. In practice each garment is usually arranged on a wire coat hanger and covered in a plastics bag or envelope, as is common in the dry cleaning industry. When a garment is picked up from its storage location it is desirable that it be turned through approximately ninety degrees so that it is conveyed edgewise on to the reception region. Such an arrangement not only reduces the air drag on the garment as it is being conveyed but also allows parallel storage rails to be placed closer together, as clearly a narrower passage may be left between the rails for the passage of a garment edgewise on than if it is to be conveyed broadside on. However, when it is attempted to convey a garment edgewise on, the aerodynamic forces acting on it as it travels along tend to turn it about its longitudinal axis towards the broadside on position. This not only causes increased drag, but if the passage for conveying garments between two storage rails is relatively narrow, the garment being conveyed then tends to collide with other garments stored on the rails and become entangled or fouled. Also, if the reception region includes a relatively narrow slot-like opening through which the garment passes for presentation to the customer, it is essential that the garment be presented to the opening edgewise on or otherwise it will not enter the slot, and satisfactory delivery will be prevented.

It is an object of the present invention to provide an improved self-service apparatus for the delivery of garments and other sheet-like articles.

The present invention consists in a self-service apparatus for the delivery of sheet-like articles, comprising a plurality of locations at each of which can be stored an article ready to be delivered to a customer, conveyor means for picking up and conveying an article from any specific location to a reception region at which the article can be received by a customer and operating means actuated in response to an authorised request for initiating operation of the conveyor means to pick up and deliver an article from a specified location to the customer wherein the apparatus includes a control device which is actuated as a selected article is picked-up by the conveyor means to rotate the article from its storage position to a position at which it is conveyed edgewise on towards the reception region and to maintain the article in this edgewise on attitude as it is being conveyed.

Preferably the control device is mounted on the conveyor means and is so arranged that it can be moved between an inoperative position and an operative position. The control device may take any one of various forms, but in a preferred form it consists of a loop-like member mounted on a arm by means of which it may be swung between its operative and inoperative positions.

In one embodiment of the invention, the apparatus comprises two parallel rails each provided with a plurality of storage locations, for example defined by notches, at which sheet-like articles may be suspended such that they lie in planes normal to the direction of the rails. The rails are so spaced as to define a passageway between them when they each carry suspended articles. The conveyor means may comprise a carriage which is mounted above or on the rails so as to be capable of travel from one end of the rails to the other and which is provided with a pick-up device for picking up an article from any of the storage locations on either of the rails. The control device is also mounted on the carriage and is arranged to operate in synchronism with the operation of the pick-up device when the carriage has been moved so that the pick-up device is opposite the specific location from which an article is to be delivered.

Advantageously the reception region includes a slot having two converging input walls for guiding the article edgewise on through the slot for delivery to a customer.

Figure 2:
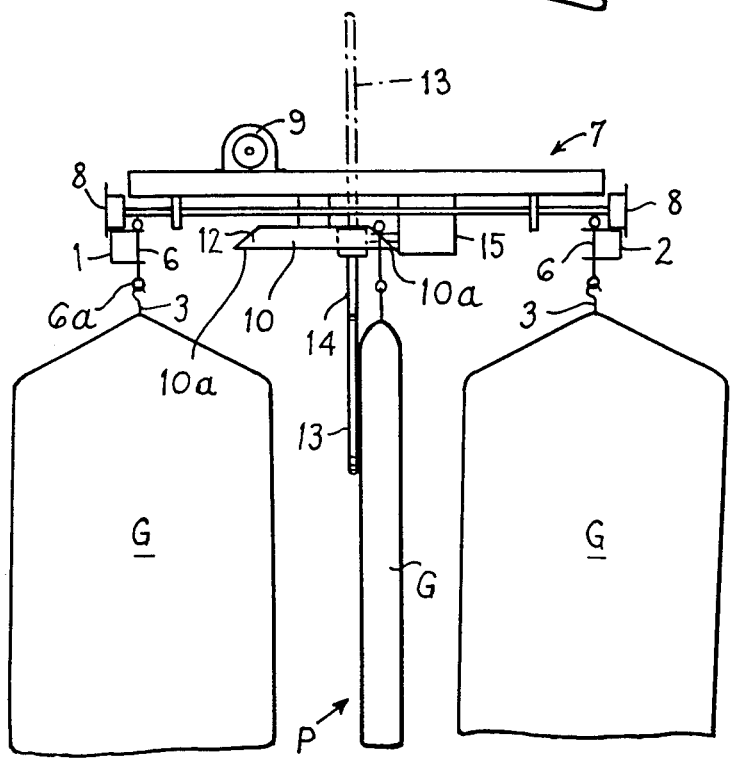

The invention will now be further described, by way of example, with reference to the accompanying drawings, in which:

FIG. 1, is a diagrammatic perspective view of one embodiment of self-service apparatus according to the invention, and FIG. 2, is a diagrammatic view of part of the apparatus viewed in the direction of arrow A in FIG. 1.

Referring to the drawings, the apparatus is intended for the self-service delivery of dry-cleaned or laundered garments to a customer in response to an authorised requesting action. Such a requesting action, which starts the operation of the apparatus, may be initiated by any suitable means as is well known in the self-service art, for example by means of a coin, token or card in combination with identification means for identifying a specific garment to be delivered.

The apparatus comprises two parallel rails 1, 2, on each of which may be suspended garments G. As is well known the garments are enclosed in a plastics bag or envelope and hung on a wire coat hanger 3. The rails are supported at the desired height and spacing by means of pillars or brackets, not shown. Each of the rails 1, 2 is of channel form and is disposed so that the open side of the channels face each other. The upper and lower side webs of each channel are provided with aligned series of notches 4, each pair of aligned upper and lower notches defining a specific location at which a garment may be suspended. This is achieved by means of a suspension device comprising a stem 6 which lies within the notches of a pair and includes a lower loop 6a for receiving the hook on a coat hanger 3 as well as an upper loop 6b which rests on the upper side web of the channel. It will be appreciated that each specific location is given a unique identification so that a garment suspended at that location can be delivered to a customer who presents a corresponding identification when they initiate a request for that garment and start the operation of the apparatus.

The means for conveying a garment from its specific location to a customer comprises a carriage 7 which spans the space between the rails 1 and 2 and which is mounted on flanged wheels 8 able to travel along the upper surface of the rails. This movement of the carriage back and forth along the rails is controlled by means of an electric motor 9 through a drive mechanism, such as gears, belts or chains, not shown. The carriage 7 also supports a pick-up device in the form of a double-ended horizontal arm 10, which has tapered ends 10a. The arm 10 can be driven from side to side across the carriage by means of a further electric motor 11 and drive mechanism (not shown) so as to move the adjacent tapered end 10a into the upper loop 6b of a suspension device 6 when the carriage has travelled along the rails to a selected location defined by a pair of notches 4 on either one of the rails 1 or 2. As the tapered end enters a loop 6b, it serves to lift the suspension device 6 from off the rail and cause the loop to engage in a notch or seating 12 on that end of the arm. The suspension device 6 and a garment G hanging therefrom can now be moved out between the rails and into the passage P defined by the space between the garments G hanging from the rails. Simultaneously with this action, there is brought into operation a control device in the form of a loop 13 carried by an arm 14 and driven by an electric motor 15. The loop 13 is normally located in its inoperative position shown in full lines in FIG. 1, but upon operation of the motor 15, the arm 14 is rotated to bring the loop to its lower position as shown in broken lines in FIG. 1 and full lines in FIG. 2. As the hook on the hanger 3 is freely suspended in the lower loop 6a of the stem 6, this rotating movement causes the loop 13 to turn the garment G as it contacts the garment, so that it is turned parallel to the rails. The garment is maintained supported in this position by the loop 13 resting against it as the carriage 7 is again driven along so as to present the garment through a delivery slot S for reception by the customer. The delivery slot S is defined by the gap between two inclined walls 16 which assist in guiding the garment into the delivery slot. If desired, the loop 13 may be slightly inclined from the vertical in the lowered position so as to urge a garment to lean against it and remain in the edgewise on position as it is driven along the passage P to the slot S.

It will thus be seen that the present invention provides an effective self-service apparatus for sheetlike articles which enables a large number of articles to be accommodated in a given space and for their effective transportation edgewise through a relatively narrow passage to a reception area for delivery to a customer.

Whilst a particular embodiment has been described it will be understood that various modifications may be made without departing from the scope of this invention. Thus, one electric motor may perform more than one function through a suitable control mechanism. Also the rails may be of different form, as may also the carriage and the suspension means. Moreover the control device may be of other forms besides the loop shown provided that it is effective to turn the garments, as required.

Also, if desired, means such as doors may be provided in the customer reception region to close behind a garment presented to the delivery slot in order to prevent unauthorised access to or tampering with the apparatus. Such doors would also normally remain closed unless a garment was being delivered to a customer.

I claim:

1. In a self-service apparatus for the delivery of sheet-like articles, including two parallel rails each provided with a plurality of storage locations at which articles ready to be delivered to a customer may be suspended such that they lie in planes normal to the direction of the rails, means for spacing said rails so as to define a passageway between articles suspended from the rails, conveyor means for picking up and conveying an article from any specific location to a reception region at which the article can be received by a customer, said conveyor means comprising a carriage which is mounted over said rails so as to be capable of travel from one end of the rails to the other and a pick-up device for picking up an article from any of the storage locations on either of the rails, and operating means actuated in response to an authorized request for initiating operation of the conveyor means to pick up and deliver an article from a specified location to the customer, the improvement which comprises a control device which is mounted on the conveyor means and actuated as a selected article is picked-up by the conveyor means, the said control device consisting of a member mounted on an arm and means for rotating said arm so that said control device can be swung between an inoperative position and an operative position, so as to rotate the article from its storage position to a position at which it is conveyed edgewise-on towards the reception region, said control device further being operative to maintain the article in this edgewise-on attitude as it is being conveyed.

2. Apparatus as claimed in claim 1, in which said control device is mounted on said carriage and means to operate said control device in synchronism with the operation of the pick-up device when the carriage has been moved to a position in which said pick-up device is opposite the specific location from which an article is to be delivered.

3. Apparatus as claimed in claim 1, in which each of said rails is of channel form and the rails are disposed so that the open side of the channels face each other, aligned series of notches in the upper and lower side webs of each channel, each pair of aligned upper and lower notches defining a specific location at which an article may be suspended.

4. Apparatus as claimed in claim 3, in combination with a suspension device for each specific location, each said suspension device comprising a stem which lies within the upper and lower notches of a pair, each said stem carrying a lower loop for receiving the hook on a coat hanger as well as an upper loop which rests on the upper side web of the channel.

5. Apparatus as claimed in claim 4, in which said pick-up device is in the form of a double-ended horizontal arm, which has tapered ends and which can be driven from side to side across said carriage so as to move the adjacent tapered end into the upper loop of a suspension device when the carriage has travelled along the rails to a selected specific location, the action of said tapered end entering an upper loop serving to lift that suspension device from off the rail and cause said loop to engage in a seating on that end of said arm.

6. Apparatus as claimed in claim 5, in which said control device is in the form of a loop carried by an arm and driven by an electric motor, and as said suspension device and an article hanging on a coat hanger are moved out between the rails and into the passage defined by the space between the articles hanging from the rails, means are operative to actuate said control device such that said arm is rotated to bring the loop to its operative position and thereby turn the article so that it lies in a plane parallel to the rails, in which position said article is maintained supported by the loop resting against it as the carriage is driven along to said reception region for reception of said article by the customer.

7. Apparatus as claimed in claim 6, in which said control device is slightly inclined from the vertical in its operative position so as to urge an article to lean against it and remain in the edgewise on position as it is driven along the passage to the reception region.

* * * * *